United States Patent [19]

Komatsu

[11] Patent Number: 5,442,915
[45] Date of Patent: Aug. 22, 1995

[54] BRAKE FLUID PRESSURE GENERATOR

[75] Inventor: Kazunari Komatsu, Yamanashi, Japan

[73] Assignee: Tokico Ltd., Kanagawa, Japan

[21] Appl. No.: 145,798

[22] Filed: Oct. 29, 1993

[30] Foreign Application Priority Data

Oct. 30, 1992 [JP] Japan ............................ 4-075714 U

[51] Int. Cl.⁶ ............................................. B60T 13/00
[52] U.S. Cl. .................................................. 60/547.1
[58] Field of Search ............... 60/547.1, 552, 553, 60/554; 91/369.1

[56] References Cited

U.S. PATENT DOCUMENTS

| | | | |
|---|---|---|---|
| 3,150,493 | 9/1964 | Rike | 91/369.4 |
| 4,227,371 | 10/1980 | Takeuchi | 60/547.1 |
| 4,271,670 | 6/1981 | Ohmi | 91/369.3 |
| 4,400,942 | 8/1983 | Reinartz et al. | 60/547.1 |

FOREIGN PATENT DOCUMENTS

| | | | |
|---|---|---|---|
| 36754 | 3/1983 | Japan | 91/369.2 |
| 75505 | 3/1983 | Japan | 60/547.1 |
| 2-50680 | 1/1992 | Japan . | |

Primary Examiner—F. Daniel Lopez
Attorney, Agent, or Firm—Biebel & French

[57] ABSTRACT

The present invention provides a brake fluid pressure generator comprising a barometric pressure booster and a master cylinder interlocked to each other at an interlocking portion which has a stepped configuration. A return spring is attached to the stepped portion of the interlocking portion. A stopper is fixed to the large diameter part of the interlocking portion. The return spring has a diameter larger than the small diameter part of the interlocking portion. Because the interlocking portion comes inside the return spring when they come closer, the overall length of the master cylinder and the barometric pressure booster is made smaller. Configuration of the return spring remains simple and the number of members is maintained small.

6 Claims, 2 Drawing Sheets

BRAKE FLUID PRESSURE GENERATOR

BACKGROUND OF THE INVENTION

The present invention relates to an brake fluid pressure generator which combines a master cylinder and a booster of air pressure type used in vehicular braking devices.

As brake fluid pressure generator used in vehicular braking systems, there are conventionally known devices which are provided with a booster of air pressure type having a power piston which is supported by a shell and which moves by means of the differential pressure generated in both sides of power piston, a return spring which is provided between the power piston and the inner end portion of the interlocking portion of the shell which is formed so as to project inward in the direction of movement of the power piston, and an output shaft provided to the moving side of the power piston; and with a master cylinder wherein a single ended opening is inserted into the interlocking portion of the shell, a piston provided internally moves by means of the output of the output shaft to generate brake fluid pressure, and a stopper member for preventing the pulling out of the piston is interlocked with the opening.

In order to shorten the total length of a brake fluid pressure generator of the above described type, it is conceivable to make the projection amount large for the interlocking portion of the shell, and to make the insertion amount of the power piston to the interlocking portion large. However, when the projection amount of the interlocking portion is made large, the setting length of the return spring is shortened. For this mason, the setting of the return spring, which is strict with regard to stress, becomes difficult.

Moreover, an earlier application, *Utility Model Application Hei* 2-50680, by the present applicant discloses a brake fluid pressure generator designed with the aforementioned objective of shortening total length in mind. This device shortens the total length of the brake fluid pressure generator by projecting the piston of the master cylinder toward the booster of air pressure type side, while leaving as is the amount of projection of the interlocking unchanged portion. Because the projection amount of the interlocking portion is not changed, them is sufficient length for the return spring. However, this is problematic in that the number of parts increase. Accordingly, on this point, them is still room for improvement.

SUMMARY OF THE INVENTION

It is therefore an objective of the present invention to offer a brake fluid pressure generator in which it is possible to shorten total length without shortening the setting length of the return spring nor increasing the number of parts.

In order to achieve the aforementioned objective, the brake fluid pressure generator of the present invention is provided with a booster of air pressure type having a power piston which is supported by a shell and moves by means of the differential pressure generated in opposite sides, a return spring which is provided between the power piston and the inner end portion of the shell's interlocking portion which is formed so as to project inward in the direction of movement of the power piston, and an output shaft provided to the moving side of the power piston; and with a master cylinder wherein a single ended opening is inserted into the interlocking portion of the shell, a piston internally provided moves by means of the output shaft to generate brake fluid pressure, and a stopper member for preventing the pulling out of the piston interlocks with the opening. In particular, the brake fluid pressure generator of the present invention is characterized in that the side of the power piston imparts a stepped configuration to the interlocking portion of the booster of air pressure type and the opening of the master cylinder, and in that the return spring is brought into contact with the stepped portion of the interlocking portion and the stopper member is interlocked at the large diameter side of the opening.

In the brake fluid pressure generator of the present invention, the interlocking portion of the booster of air pressure type and the master cylinder opening which is inserted thereinto are given a stepped configuration by the side of the power piston. The return spring which is provided between the power piston and the interlocking portions comes in contact with the stepped portion of the interlocking portions. As a result, because the small diameter portion of the interlocking portion of the booster of air pressure type is inserted within the return spring and the small diameter portion of the opening of the master cylinder is inserted into the aforementioned small diameter portion of the interlocking portion, it is possible to enlarge the amount of insertion of the master cylinder in the booster of air pressure type without shortening the setting length of the return spring. Moreover, because the piston of the master cylinder does not project toward the booster of air pressure type, the number of component parts does not increase. Further, because the stopper member for preventing the pulling out of the piston interlocks with large diameter portion of the opening of the master cylinder, there is no need to provided an interlocking structure to the small portion, the thickness thereof can be maintained and there is no reduction in strength.

DETAILED DESCRIPTION OF THE PRESENT INVENTION

Figure 1:
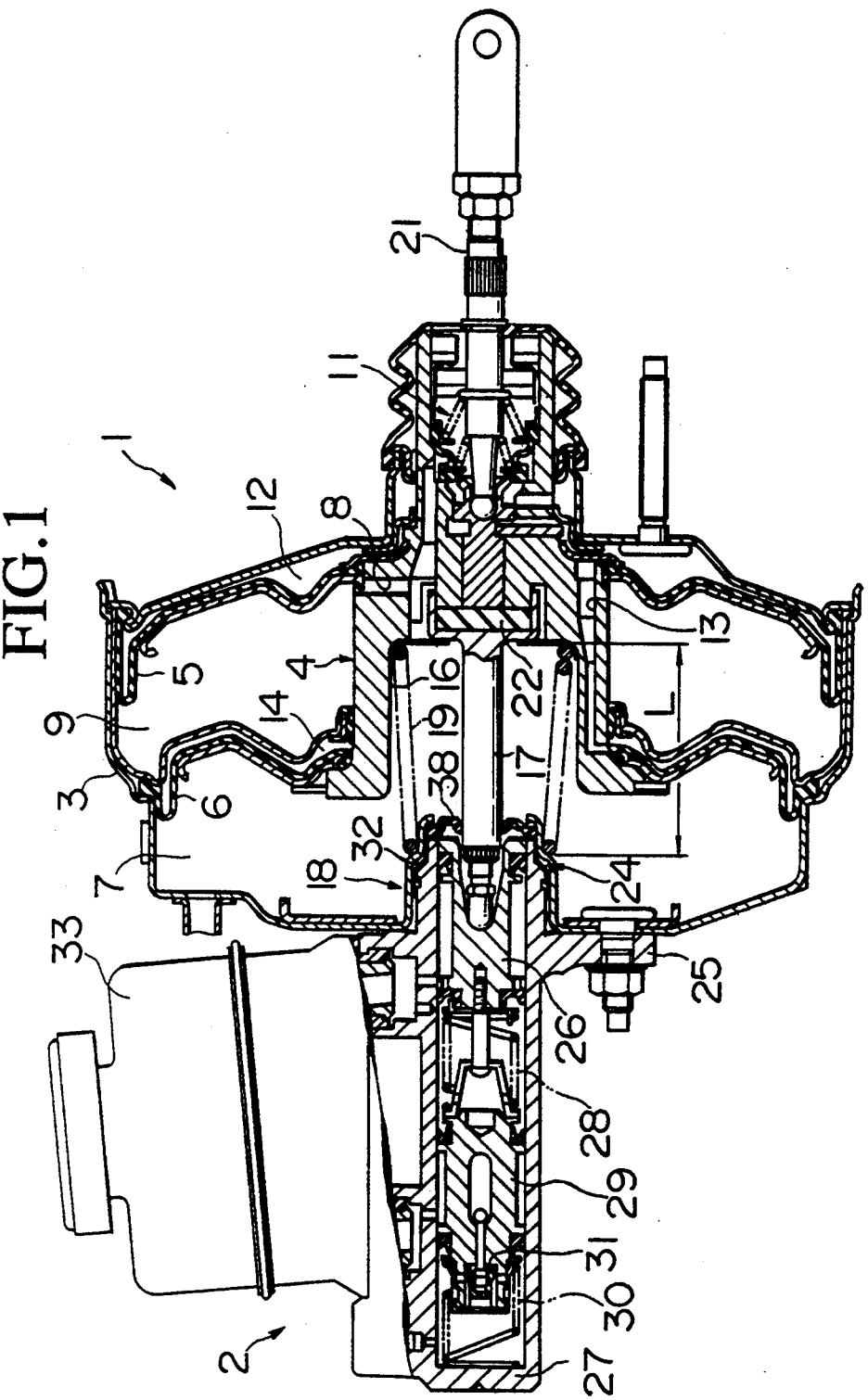
FIG. 1 is a cross sectional diagram of the brake fluid pressure generator according to an embodiment of the present invention.

An explanation will now be made of the brake fluid pressure generator according to an embodiment of the present invention, with reference being made to FIGS. 1 and 2.

The brake fluid pressure generator of the present invention combines a booster of air pressure type 1 and a master cylinder 2. The booster of air pressure type 1 will first be explained.

The booster of air pressure type of the present embodiment is a so called tandem type device. A power piston 4 is supported by a shell 3, which forms the outer shell of the booster of air pressure type and which is of an approximately constant thickness, so as to permit the movement of power piston 4. The inner space of shell 3 is sectioned by power piston 4 and diaphragms 5, 6, such that negative pressure chamber 7 which communicates with a negative pressure source (not pictured in the figures), negative pressure chamber 9 which communicates with the negative pressure chamber 7 via a passageway 8 provided in the power piston 4, an actuating pressure chamber 12 which can be changed over to communicate with either the atmosphere or with a negative pressure source by a valve 11 provided in power piston 4, and an actuating pressure chamber 14 which communicates with actuating pressure chamber 12 via a passageway 13 provided in power piston 4, are disclosed in the order of, from the master cylinder 2 side, negative pressure chamber 7, actuating pressure chamber 14, negative pressure chamber 9, and actuating pressure chamber 12. Further, a concavity 16 is formed to the master cylinder 2 side of the power piston 4. An output shaft 17 which extends in the direction of the master cylinder 2 is provided in the center of concavity 16. Further, interlocking portion 18 is formed in the side of the shell 3 which is in the direction of movement of the power piston (left side in FIG. 1) so as to project inwardly in an approximate cylindrical shape. A return spring 19 is provided between the interlocking portion 18 and the bottom of the concavity 16 of the power piston 4.

In the booster of air pressure type 1, when the brake pedal (not pictured in the figures) is operated, an operating rod 21, which is connected with the brake pedal, moves, operating valve 11. Actuating pressure chambers 12 and 14 are brought into communication with the atmosphere, generating a differential pressure in both sides of power piston 4 whereby power piston 4 is moved against the applied force of return spring 19. As a result, a driving force accompanying the differential pressure is generated on output shaft 17 which is provided from the power piston 4 via a rear cushion disk 22 formed of an elastic material, an output to the master cylinder 2 side is thereby carried out. Further, when the brake pedal is released, the reaction force from output shaft 17 is communicated via rear cushion 22, and valve 11 brings actuating chambers 12 and 14 into communication with the negative pressure source via the negative pressure chambers 7 and 9, reducing the differential pressure of power piston 4. As a result, power piston 4 returns under the applied force of the return spring 19, and the output to master cylinder 2 is canceled. Further, when the input of operating rod 21 and the reaction force from output shaft 17 are balanced, valve 11 does not bring actuating pressure chambers 12 and 14 into communication with either the atmosphere or the negative pressure source. As a result, the output from output shaft 17 at this time is maintained.

Master cylinder 2, which is of an approximate cylindrical shape with a bottom and has an opening (a convex interlocking portion) 24 in one end, and is attached to the booster of air pressure type 1 by a flange 25 in a state wherein the opening 24 is inserted within interlocking portion 18 of the booster of air pressure type. Further, internally, a primary piston 26 which receives the output of the output shaft 17 is provided at the opening 24 side, and a secondary piston 29 which is connected to the primary piston 26 via spring 28 is provided at the bottom 27 side. Spring 30 is provided between secondary piston 29 and bottom 27. Additionally, a valve 31 which is closed by the movement of secondary piston 29 is provided in secondary piston 29. Stopper member 32 of an approximate constant thickness for preventing the pulling out of primary piston 26 is interlocked with the opening 24.

In master cylinder 2, primary piston 26 and secondary piston 29 move according to the output of output shaft 17, and the brake fluid stored in reservoir 33 is output to specified brake circuits which are connected to a wheel cylinder not pictured in the figures.

Figure 2:
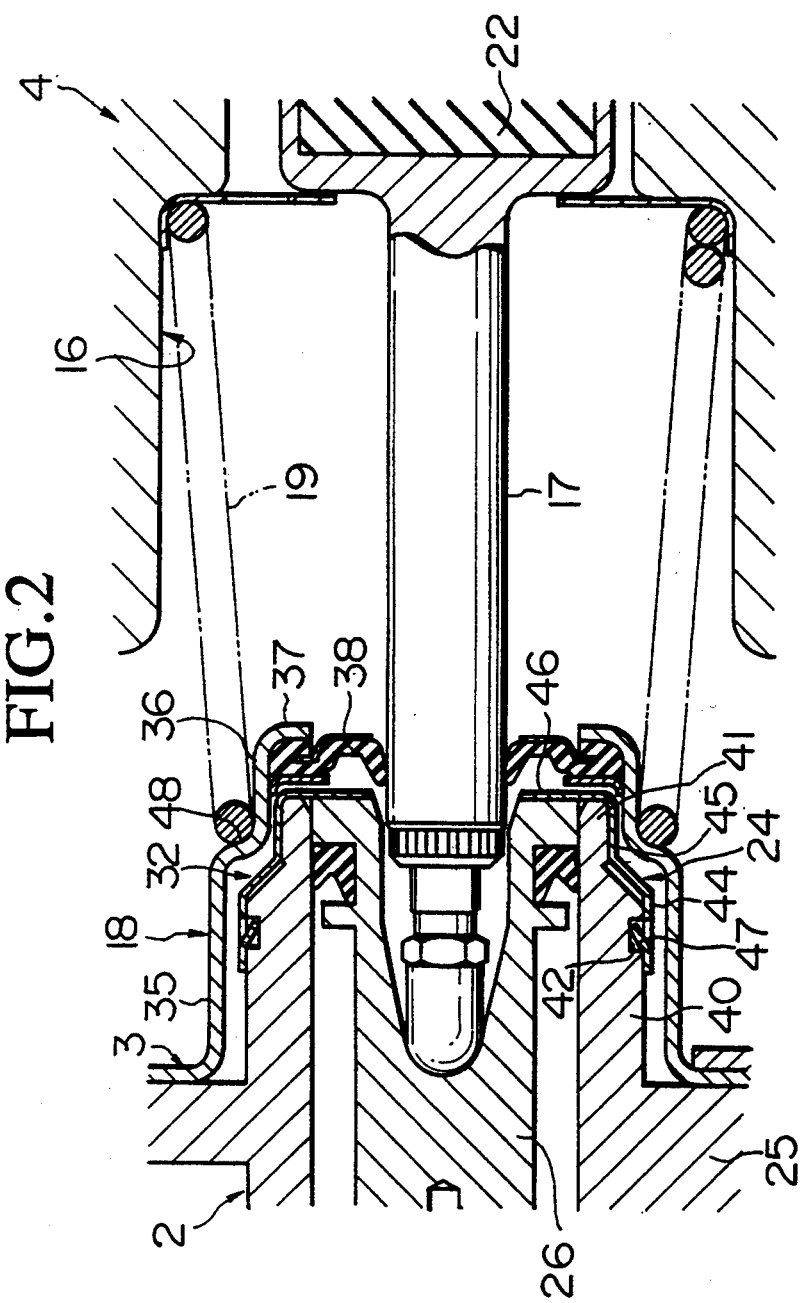
FIG. 2 is a blown up cross sectional partial diagram showing the essential pass of the brake fluid pressure generator according to an embodiment of the present invention.

In the present embodiment, as shown in FIG. 2, the interlocking portion 18 of shell 3 of booster of air pressure type 1 is formed in a stepped shape comprising a large diameter portion 35 on the master cylinder 2 side and a small diameter portion 36 which has a specified diameter smaller than the large diameter portion 35 on the power piston 4 side of the large diameter portion 35. Stopping portion 37 which extends radially inwardly by a specified amount and so as not to interfere with output shaft 17, is formed to the end portion of the power piston 4 side of the small diameter portion 36. Further, sealing material 38 which seals the space between output shaft 17 and interlocking portion 18 is adhered to the master cylinder 2 side of stopping portion 37.

Further opening 24 of master cylinder 2 which is inserted into interlocking portion 18 also forms a stepped configuration comprising a large diameter cylindrical section 40 and a small diameter cylindrical section 41 which is provided to the end portion of the master cylinder 2 and has a specified diameter less than the outer diameter of large diameter cylindrical section 40. A recess 42 depressed by a specific amount radially is formed to the external periphery of large diameter cylindrical section 40 in the vicinity of small diameter cylindrical section 41.

Further, stopper member 32 for preventing pulling out of the primary piston 26 also forms a stepped configuration having a large diameter engaging portion 44 which engages with the external periphery of large diameter cylindrical section 40 and a small diameter engaging portion 45 which engages with the external periphery of small diameter cylindrical section 41. A stopper 46 which extends radially inward by a specified amount not interfering with output shaft 17 and which can contact primary piston 26 is formed to the end of power piston 4 side of the small diameter engaging portion 45. Further, a stopper piece 47 which is bent inwardly and which stops stopper member 32 in opening 24 by interlocking with recess 42, is formed to the large diameter engaging portion 44.

Small diameter cylindrical section 41 of master cylinder 2 and small diameter engaging portion 45 of the stopper member 32 which covers small diameter cylindrical section 41 are inserted into small diameter portion 36 of interlocking portion 18 when the large diameter cylindrical section 40 and the large engaging portion 44 are inserted into the large diameter portion 35. In this state, by bringing flange 25 into contact with shell 3, master cylinder 2 is attached to booster of air pressure type 1. At this time, a specified interval of space is maintained between the large diameter engaging portion 44 of the stopper member 32 and the large diameter portion 35 of the shell 3. Moreover, a small interval of space is also maintained between the small diameter engaging portion 45 of stopper member 32 and the small diameter portion 36 of shell 3.

Additionally, when small diameter portion 36 of interlocking portion 18 is inserted inside, one end of return spring 19 contacts the stepped portion 48 between large diameter portion 35 and small diameter portion 36. Further, the diameter of small diameter portion 36 of interlocking portion 18 has specified diameter smaller that the diameter of concavity 16 of power piston 4, and matching this, the concavity 16 side of return spring 19 has a large diameter and the interlocking portion 18 side of return spring has a small diameter.

In the brake fluid pressure generator of the present embodiment having the structure as described above, the interlocking portion 18 of the booster of air pressure type 1 and opening 24 of the master cylinder 2 which is inserted thereinto are given a stepped configuration by the power piston 4 side. The return spring 19 which is provided between the power piston 4 and the interlocking portion 18 comes in contact with the stepped portion 48 of the interlocking portion 18. As a result, because the small diameter portion 36 of the interlocking portion 18 is inserted within the return spring 19 and the small diameter cylindrical section 41 of the master cylinder 2 is inserted into the aforementioned small diameter portion 36, it is possible to enlarge the amount of insertion of the master cylinder 2 in the booster of air pressure type 1 without shortening the setting length (indicated by L in FIG. 1) of the return spring 19. Accordingly, the setting of the return spring 19 becomes easy, and the total length of an brake fluid pressure generator which combines a booster of air pressure type 1 and a master cylinder 2 can be shortened.

Furthermore, because the design does not call for the primary piston of the master cylinder to project toward the booster of air pressure type, there is no increase in the number of parts. Additionally, the present invention eliminates the need for strict management and high reliability of such factors as dimensions, roughness and the like of the primary piston and sealing material, as is required for a master cylinder of the type wherein the primary piston is projected toward the booster of air pressure type. Moreover, by merely changing one portion of the opening side of the conventional straight bore type master cylinder, general internal parts may be used for the brake fluid pressure generator of the present invention. Thus, it is possible to realize a greater shortening of total length of the brake fluid pressure generator at a low cost.

Further, because stopper member 32 for preventing pulling out of the primary piston 26 interlocks stopper piece 47 with groove 42 which is provided to the large diameter cylindrical section 40 of opening 24, it is not necessary to provide a groove to small diameter cylindrical portion 41, making it possible to maintain the thickness thereof and to assure a degree of strength comparable to conventional devices.

Additionally, the diameter of small diameter portion 36 of interlocking portion 18 has a specified diameter smaller than that of concavity 16 of power piston 4 and, matching this, the concavity 16 side of return spring 19 has a large diameter and the interlocking portion 18 side of return spring 19 has a small diameter. For this reason, return spring 19 does not interfere with power piston 4 during the movements thereof, and it is possible to prevent the generation of interference noise when the brake is operated.

As explained above, in the brake fluid pressure generator of the present invention, the interlocking portion of the brake fluid pressure type magnifier and the master cylinder opening which is inserted them into are given a stepped configuration by the side of the power piston. The return spring which is provided between the power piston and the interlocking portions comes in contact with the stepped portion of the interlocking portions. As a result, because the small diameter portion of the interlocking portion of the booster of air pressure type is inserted within the return spring and the small diameter portion of the opening of the master cylinder is inserted into the aforementioned small diameter portion of the interlocking portion, it is possible to enlarge the amount of insertion of the master cylinder in the booster of air pressure type without shortening the setting length of the return spring. Accordingly, the setting of the return spring becomes easy, and it is possible to shorten the total length of the brake fluid pressure generator. Moreover, because the piston of the master cylinder does not project toward the booster of air pressure type, the number of component parts does not increase, and it is possible to realize the device at low cost. Further, because the stopper member for preventing the pulling out of the piston interlocks with the large diameter portion of the opening of the master cylinder, there is no need to provide an interlocking structure to the small diameter portion, the thickness thereof can be maintained and it is possible to ensure a degree of strength comparable to conventional devices.

What is claimed is:

1. A brake fluid pressure generator comprising a booster of air pressure type and a master cylinder:
    said booster of air pressure type comprising:
    (a) an outer shell defining an outer periphery of said booster of air pressure type;
    (b) a power piston supported in said outer shell so as to be movable within said outer shell by means of a pressure difference between an actuating chamber and a negative pressure chamber provided on opposite sides of said power piston and defined by said power piston and said outer shell;
    (c) a concave interlocking portion formed inside said outer shell protruding into said negative pressure chamber;
    (d) a return spring provided between said power piston and said concave interlocking portion so as to urge said power piston in a direction of said actuating chamber; and
    (e) an output shaft provided in mechanical contact with said power piston; and said master cylinder comprising:
    (f) a convex interlocking portion fixedly received by said concave interlocking portion of said booster of air pressure type;
    (g) a piston for creating brake fluid pressure, said piston being in mechanical contact with said power piston through said output shaft; and
    (h) a stopper member for limiting movement of said piston;
    wherein said concave interlocking portion has a stepped configuration, said return spring is brought into contact with a stepped portion of said concave interlocking portion, and said convex interlocking portion is inserted into a small diameter portion of said concave interlocking portion.

2. A brake fluid pressure generator according to claim 1 wherein a concavity is formed in said power piston on a side defining said negative pressure chamber for receiving an end portion of said return spring; said concavity having a diameter larger than a diameter of a small diameter part of said concave interlocking portion; and said end portion of said return spring has a diameter larger than the other end portion of said return spring.

3. A brake fluid pressure generator according to claim 1 wherein said convex interlocking portion is provided with a stepped configuration, and said stopper member is interlocked at a large diameter part of said convex interlocking portion.

4. A brake fluid pressure generator according to claim 3 wherein a concavity is formed in said power piston on a side defining said negative pressure chamber for receiving an end portion of said return spring; said concavity having a diameter larger than a diameter of a small diameter part of said concave interlocking portion; and said end portion of said return spring has a diameter larger than the other end portion of said return spring.

5. A brake fluid pressure generator comprising a booster of air pressure type and a master cylinder:

said booster of air pressure type comprising:
  (a) an outer shell defining an outer periphery of said booster of air pressure type;
  (b) a power piston supported in said outer shell so as to be movable within said outer shell by means of a pressure difference between an actuating chamber and a negative pressure chamber provided on opposite sides of said power piston and defined by said power piston and said outer shell;
  (c) a concave interlocking portion formed inside said outer shell protruding into said negative pressure chamber;
  (d) a return spring provided between said power piston and said concave interlocking portion so as to urge said power piston in a direction of said actuating chamber; and
  (e) an output shaft provided in mechanical contact with said power piston; and said master cylinder comprising:
  (f) a convex interlocking portion fixedly received by said concave interlocking portion of said booster of air pressure type;
  (g) a piston for creating brake fluid pressure, said piston being in mechanical contact with said power piston through said output shaft; and
  (h) a stopper member for limiting movement of said piston;

wherein said concave interlocking portion and said convex interlocking portion have stepped configurations, said return spring is brought into contact with a stepped portion of said concave interlocking portion, said stopper member is interlocked at a large diameter part of said convex interlocking portion, said stopper member has a generally cylindrical configuration comprising a stopper part for coming in contact with said piston to limit the movement of said piston, a small diameter fixing portion in fixed contact with a small diameter part of said convex interlocking portion, a large diameter fixing portion in fixed contact with a large diameter part of said convex interlocking portion;

a claw is formed on said large diameter fixing portion; and a recess is formed in a large diameter portion of said convex interlocking portion, wherein said claw is received by said recess for fixation of said stopper member.

6. A brake fluid pressure generator according to claim 5 wherein a concavity is formed in said power piston on a side defining said negative pressure chamber for receiving an end portion of said return spring; said concavity having a diameter larger than a diameter of a small diameter part of said concave interlocking portion; and said end portion of said return spring has a diameter larger than the other end portion of said return spring.

* * * * *